United States Patent
Tsuge

(10) Patent No.: US 7,717,458 B2
(45) Date of Patent: May 18, 2010

(54) INTERIOR PARTS FOR A VEHICLE

(75) Inventor: Hisao Tsuge, Anjo (JP)

(73) Assignee: Inoac Corporation, Aichi (JP)

( * ) Notice: Subject to any disclaimer, the term of this patent is extended or adjusted under 35 U.S.C. 154(b) by 608 days.

(21) Appl. No.: 11/529,374

(22) Filed: Sep. 28, 2006

(65) Prior Publication Data

US 2007/0075531 A1 Apr. 5, 2007

(30) Foreign Application Priority Data

Sep. 30, 2005 (JP) ............... 2005-288139

(51) Int. Cl.
*B60R 21/04* (2006.01)
*B60R 21/215* (2006.01)
*B60R 21/213* (2006.01)

(52) U.S. Cl. ............... 280/728.2; 296/39.1; 296/193.06; 24/458

(58) Field of Classification Search ............... 280/728.2, 280/730.2; 296/39.1, 1.08, 193.06; 24/453, 24/457, 458

See application file for complete search history.

(56) References Cited

U.S. PATENT DOCUMENTS

| | | | |
|---|---|---|---|
| 5,934,729 A | | 8/1999 | Baack |
| 6,155,594 A | * | 12/2000 | Ibe et al. ............... 280/728.2 |
| 6,196,607 B1 | | 3/2001 | Gulisano |
| 6,234,515 B1 | * | 5/2001 | Iwanaga ............... 280/728.2 |
| 6,431,584 B1 | * | 8/2002 | Nagasawa et al. ......... 280/728.2 |
| 6,664,470 B2 | * | 12/2003 | Nagamoto ............... 174/652 |
| 7,077,449 B2 | * | 7/2006 | Tokunaga ............... 296/39.1 |
| 7,246,817 B2 | * | 7/2007 | Tanase ............... 280/730.2 |
| 7,340,808 B2 | * | 3/2008 | Baekelandt ............... 24/453 |
| 2004/0245798 A1 | | 12/2004 | Tokunaga | |

FOREIGN PATENT DOCUMENTS

| | | |
|---|---|---|
| FR | 2 780 115 | 12/1999 |
| JP | 02 2512 | 1/1990 |
| JP | 2003-95033 | 4/2003 |

* cited by examiner

*Primary Examiner*—Paul N Dickson
*Assistant Examiner*—Drew Brown
(74) *Attorney, Agent, or Firm*—William L. Androlia; H. Henry Koda

(57) ABSTRACT

Interior parts for vehicles such as a front pillar garnish having a mounting bracket 32 to which a mounting clip 40 is connected so that the front pillar garnish is mounted to a front pillar. The mounting bracket 32 is formed on the inner side (that faces the front pillar) of the garnish main body 30 and has an inclined guiding portion 70 in its accommodating space 36 so that the flexible portion 46 of the mounting clip 40 inserted into the accommodating space 36 is bent inside the mounting bracket 32 by the inclined guiding portion 70, and the second engaging portion 50 at the distal end of the flexible portion 46 is prevented from contacting the garnish main body 30 by way of the opening 72 of the mounting bracket 32, thus allowing the mounting clip 40 not to be forcibly pressed against the garnish main body 30.

5 Claims, 12 Drawing Sheets (a)  (b)

Fig.6
(a)
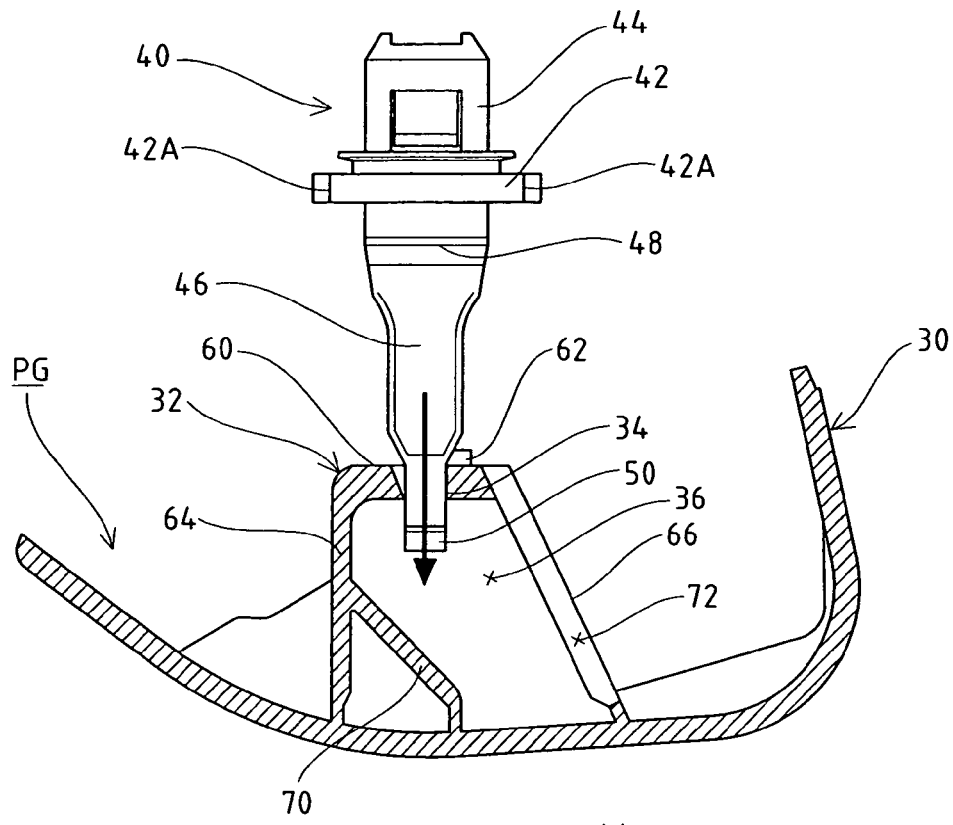
(b)
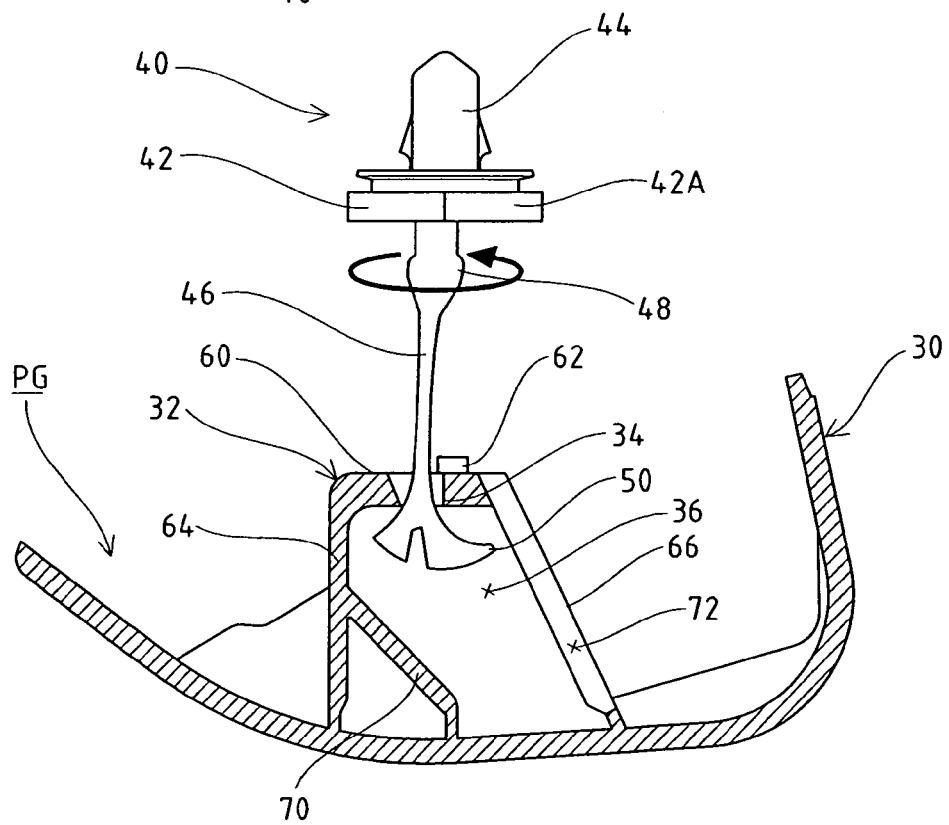

Fig.7
(a)
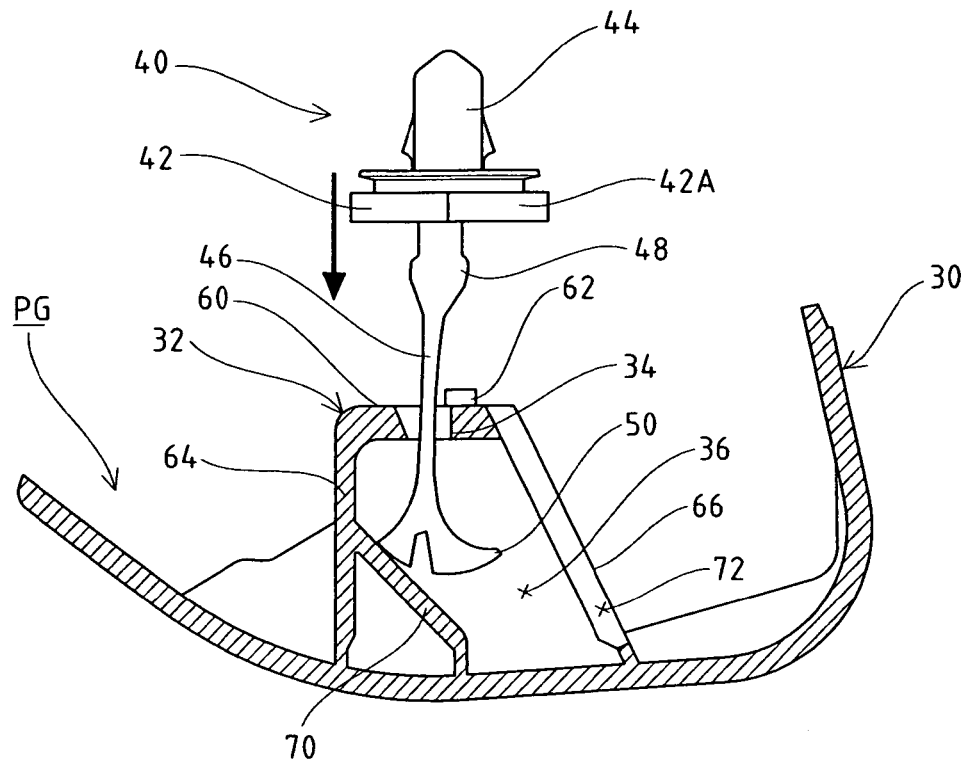
(b)
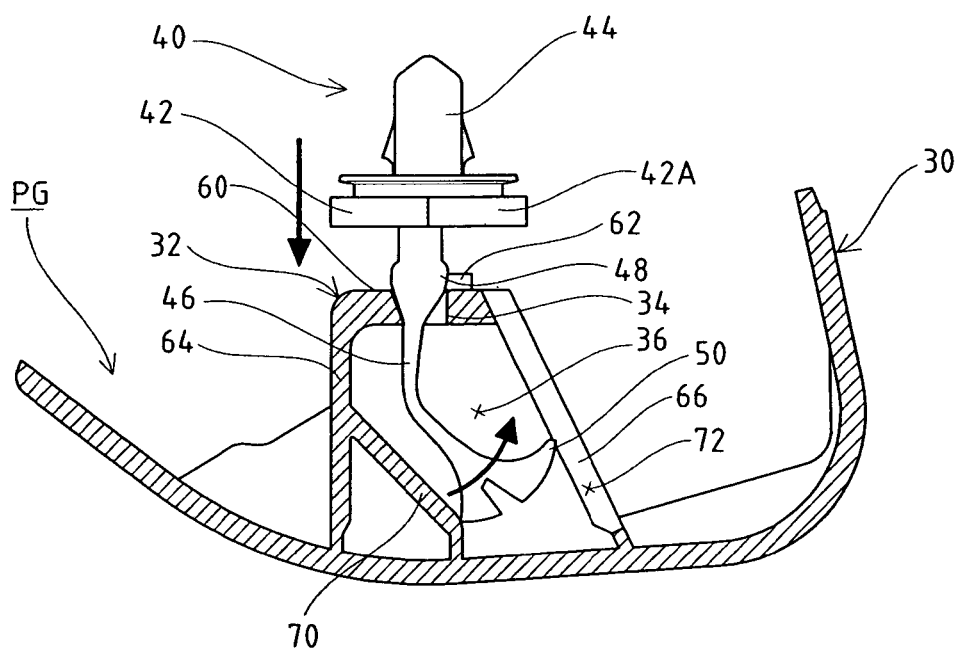

Fig.16
[Prior Art]
(a)
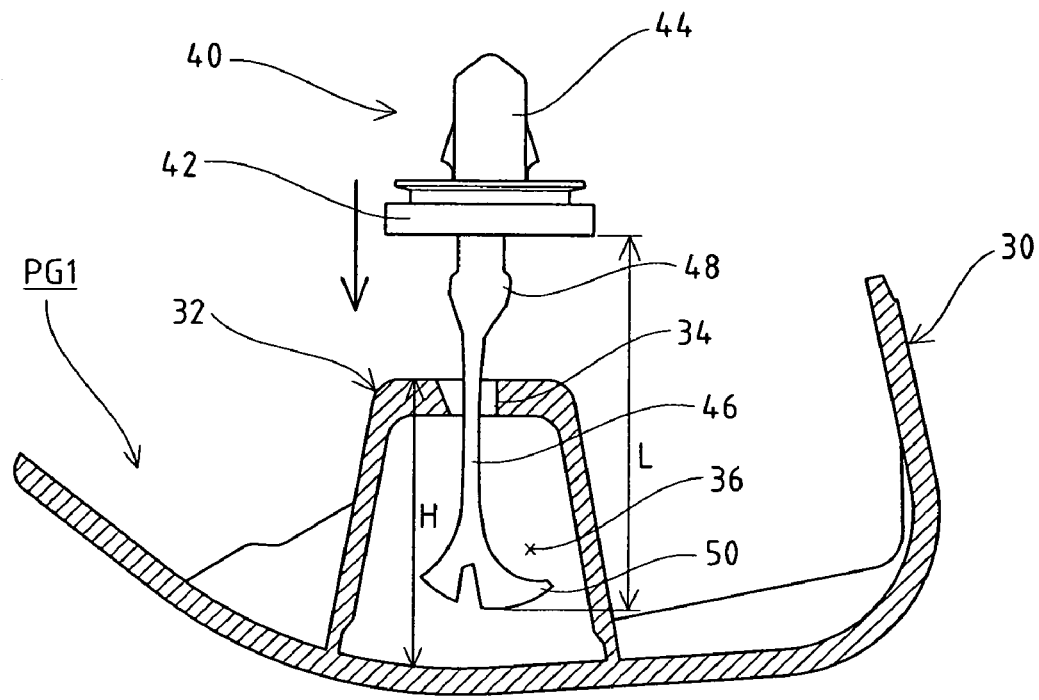
(b)
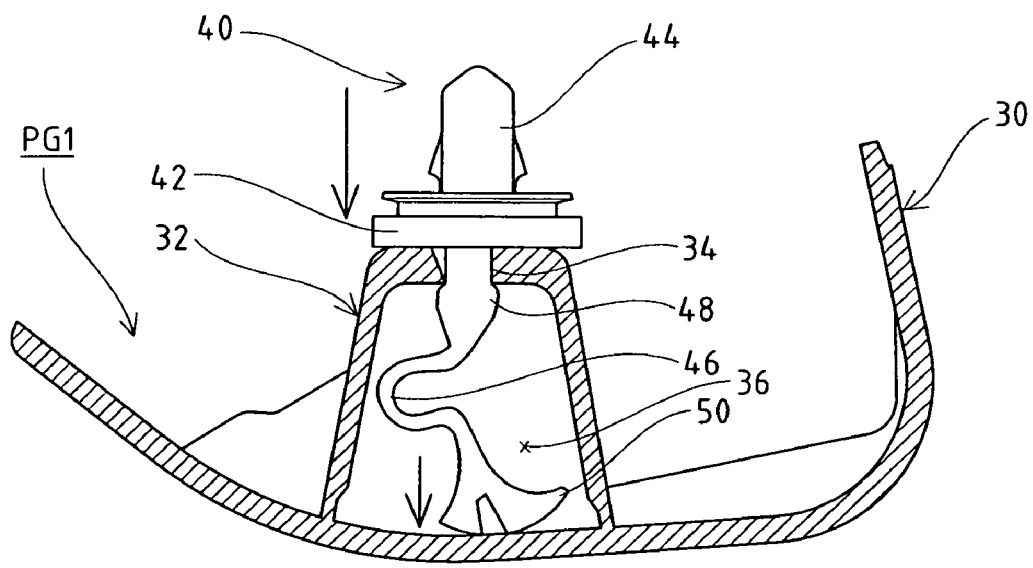

INTERIOR PARTS FOR A VEHICLE

BACKGROUND OF THE INVENTION

1. Field of the Invention

The present invention relates to interior parts for a vehicle (hereinafter referred to as an "interior part") and more particularly to a mounting structure of a vehicular interior part to vehicle body portions having air bag components disposed therein.

2. Description of the Prior Art

In recent automobiles, in order to protect a vehicle occupant from an impact caused by a side collision accident or the like, a side air bag apparatus is installed inside a side portion of a seat back for protecting the upper body of the vehicle occupant, and also put to practical use is a curtain air bag apparatus is also installed inside a vehicle portion running from the front pillar to the roof side frame (and to the rear pillar) for protecting the head of the vehicle occupant.

FIG. 13 is a cross sectional view of an air bag 14 of a curtain air bag apparatus AU expanded and developed within the interior of a vehicle.

The curtain air bag apparatus AU includes an air bag 14 and an inflator (not shown) which is disposed in the lower portion or the like of the front pillar 10. The air bag 14 is, as shown in FIG. 14, folded and accommodated in a space D that is defined by the inner side of a front pillar garnish PG1 of the front pillar 10 and the back side of a roof side garnish RG1 (see FIG. 13). When a collision detecting sensor detects impact, the inflator operates to instantly deploy the air bag 14 in the vehicle interior, thereby covering the side window glass 18 with the deployed air bag 14.

In the curtain air bag apparatus AU, various types of air bags have been put to practical use. For example, in one type of air bag shown in FIG. 13, the air bag extends from the front pillar garnish PG1 to the roof side garnish RG1, and in another type, the air bag extends only to a portion of the roof side garnish RG1. In the case of the former type, an air bag supporting member 16 and a part of the air bag 14 are accommodated inside the front pillar garnish PG1. On the other hand, in the case of the latter type, the air bag supporting member 16 is accommodated inside the front pillar garnish PG1. In the following description, both the air bag 14 and the air bag supporting member 16 are collectively referred to as "air bag components" as well.

As shown by broken lines in FIG. 13, the air bag 14 and the air bag supporting member 16 that form the air bag components are accommodated inside the front pillar garnish PG1 and roof side garnish RG1. In the front pillar garnish PG1, as shown in FIG. 14, a weather strip 24 disposed along the front pillar 10 is brought in tight contact with the edge portion of the front pillar garnish PG1. The roof side garnish RG1 has the same construction as that of the front pillar garnish PG1. Hence, neither the air bag 14 nor the air bag supporting member 16 is exposed to the interior of the vehicle. When the curtain air bag apparatus AU operates upon collision of the vehicle, a gap through which the air bag 14 or the air bag supporting member 16 is made to pass is formed in a boundary portion between the front pillar 10 and the front pillar garnish PG1, or in a boundary portion between the roof side frame 12 and the roof side garnish RG1.

For example, in the front pillar garnish PG1 shown in FIG. 14, one or plural mounting brackets 32 are formed on the inner side of a garnish main body 30, which is able to cover the front pillar 10, so as to protrude from the inner side of the garnish main body 30. Thus, the front pillar garnish PG1 is mounted to the front pillar 10 through a mounting clip 40 installed in the mounting bracket 32. More specifically, as shown in FIG. 16(a), the mounting clip 40 is comprised of:

(a) an engagement fixing portion 44 which is formed on one side of the flange portion 42 and which is adapted to be inserted and engaged with an engagement hole 11 (see FIG. 14) of the front pillar 10;

(b) a flexible portion 46, with a total length L (see FIG. 16(a)), which is formed on the other side of the flange portion 42 so as to be longer than the protrusion height H of the mounting bracket 32;

(c) a first engaging portion 48 which is on a proximal end side of the flexible portion 46; and (d) a second engaging portion 50 which is on a distal end side of the flexible portion 46.

The second engaging portion 50 and the flexible portion 46 of the mounting clip 40 are inserted into the accommodating space 36 of the mounting bracket 32 through an engaging hole (engagement receiving portion) 34 which is provided in the top portion of the mounting bracket 32 so that the first engaging portion 48 of the mounting clip 40 engages the engaging hole 34. As a result, the mounting clip 40 is installed in the front pillar garnish PG1. In other words, the front pillar garnish PG1 is engaged with the first engaging portion 48 of the mounting clip 40 and is thus attached to the front pillar 10.

When the above-mentioned curtain air bag apparatus AU operates, the air bag 14 and/or the air bag supporting member 16 presses against the garnish main body 30 from its inner side so that the engagement of the first engaging portion 48 with the engaging hole 34 is released. As a result, as shown in FIG. 15, at least one portion of the front pillar garnish PG1 moves to the vehicle interior side for a distance that the second engaging portion 50 comes to engage the engaging hole 34 (or a distance nearly corresponding to the total length L of the flexible portion 46), so that a gap S enough for the air bag 14 and the air bag supporting member 16 to protrude is formed between the garnish main body 30 and the front pillar 10.

The roof side garnish RG1 has substantially the same construction as that of the front pillar garnish PG1 and this construction is disclosed in, for example, Japanese Patent Application Laid-Open (Kokai) No. 2003-95033.

In the above structure, in order to sufficiently secure the gap S through which the air bag 14 and the air bag supporting member 16 can protrude, as shown in FIG. 16(a), the total length L of the flexible portion 46 of the mounting clip 40 is set longer than the protrusion height H of the mounting bracket 32 in many cases. In such a size setting, as shown in FIG. 16(b) and disclosed in Japanese Patent Application Laid-Open (Kokai) No. 2003-95033, when the first engaging portion 48 of the mounting clip 40 is engaged with the engaging hole 34 of the mounting bracket 32, the distal end of the second engaging portion 50 of the mounting clip 40 inside the accommodating space 36 comes in contact with the inner surface of the garnish main body 30, so that the flexible portion 46 of the mounting clip 40 is bent inside the accommodating space 36.

However, as can be understood from FIG. 16(a), since the insertion direction (engaging direction) of the flexible portion 46 and the extension direction of the flexible portion 46 agree with each other, when the second engaging portion 50 of the mounting clip 40 touches the inner surface of the garnish main body 30, the flexible portion 46 of the mounting clip 40 hardly bends. In other words, since the flexible portion 46 has a strong resistance force against the flexibly bending deformation, the flexible portion 46 does not bend unless the mounting clip 40 is pushed into the accommodating space 36 with a considerably strong force. As a result, an excessive stress concentrates on the touch portion where the second engaging portion 50 touches the inner surface of the garnish main body 30, so that an outer surface side of the garnish main frame 30 corresponding to the touch portion changes its color to white to cause texture deterioration. In addition, since a large force is required for installing the mounting clip 40, there is also a problem that a burden imposed on a worker increases and thus a number of operating time is required for the installation work.

In addition, as shown in FIG. 16(a), during the installation of the mounting clip 40, the insertion direction of the second engaging portion 50 and flexible portion 46 of the mounting clip 40 which are brought into the accommodating space 36 through the engaging hole 34 becomes nearly vertical to the inner surface of the garnish main body 30. In this case, since the difference between the total length L of the flexible portion 46 of the mounting clip 40 and the protrusion height H of the mounting bracket 32 is at its maximum, the deformation amount of the flexible portion 46 inevitably increases. Therefore, after the mounting clip 40 is installed in the mounting bracket 32, a pressing force caused by a return elastic force of the flexible portion 46 concentrates on the garnish main body 30. For this reason, when a thermal history is applied, the touch portion in the garnish main body 30 is expansively deformed toward the outer surface in some cases, and deterioration in texture of the garnish main body 30 due to its expansive deformation is also a problem.

BRIEF SUMMARY OF THE INVENTION

In the light of the foregoing, it is an object of the present invention to provide a vehicular construction that allows easy installation of a mounting device such as a front pillar garnish without causing any deteriorations in the texture of the front pillar garnish.

The above object is accomplished by a unique structure of the present invention for interior parts for a vehicle which are mounted to vehicle body portions having air bag components disposed therein with the aid of a mounting device after its flexible portion having a predetermined length and extending therefrom is inserted into a mounting bracket protruding with a predetermined height from the inner side of the interior part; and in the present invention, the interior part includes a guiding portion against which the inserted flexible portion of the mounting device touches and is biased is provided in the accommodating space located inside the mounting bracket.

Consequently, according to the present invention, since the guiding portion is provided in the accommodating space of the mounting bracket, when the mounting device is brought thereinto for engagement, the flexible portion of the mounting device touches the guiding portion of the mounting bracket and is readily deformed. Thus, the flexible portion can be prevented from being strongly pressed against the inner surface of the interior part that has the mounting bracket thereon. As a result, since the pressing force of the flexible portion of the mounting device against the inner surface of the interior part is reduced, the outer surface of the interior part for a vehicle can be prevented from changing its color to white (whitening), and also the texture of the interior part can be prevented from being deteriorated. Consequently, the appearance of the interior part is prevented from being spoiled.

The above object is accomplished by another unique structure of the present invention for an interior part for a vehicle which includes a front pillar garnish, a roof side garnish or the like and which is mounted to a front pillar or roof side frame having air bag components disposed therein with the aid of a mounting clip after its flexible portion having a predetermined length and extending from the mounting clip therefrom is inserted into a mounting bracket which is formed on a inner surface of the interior part so as to protrude with a predetermined height from the inner surface of the interior part; and in the present invention, the interior part includes a guiding portion against which the inserted flexible portion of the mounting clip touches and is biased is provided in the accommodating space located inside the mounting bracket so as to extend in an inclined shape, and an interference avoiding means for avoiding a contact with an engaging portion provided in the distal end of the flexible portion of the mounting clip is provided on one side of the mounting bracket that faces the inclined surface of the guiding portion.

the present invention, the guiding portion is provided in the inclined shape in the accommodating space of the mounting bracket formed on the front pillar garnish or the roof side garnish; and when the mounting clip is brought into the accommodating space of the mounting bracket, the flexible portion of the mounting clip touches the inclined guiding portion and is readily deformed thereby. Thus, the flexible portion of the mounting clip can be prevented from being strongly pressed against the inner surface of the front pillar garnish or the roof side garnish that has the mounting bracket. As a result, since the pressing force of the flexible portion of the mounting clip against the inner surface of the front pillar garnish or the roof side garnish is reduced, the outer surface of the front pillar garnish or the roof side garnish can be prevented from changing its color to white (whitening), and the texture of the front pillar garnish or the roof side garnish can be prevented from being deteriorated. Thus, the appearance of the front pillar garnish or the roof side garnish is prevented from being spoiled.

BRIEF DESCRIPTION OF THE INVENTION

Figure 4:
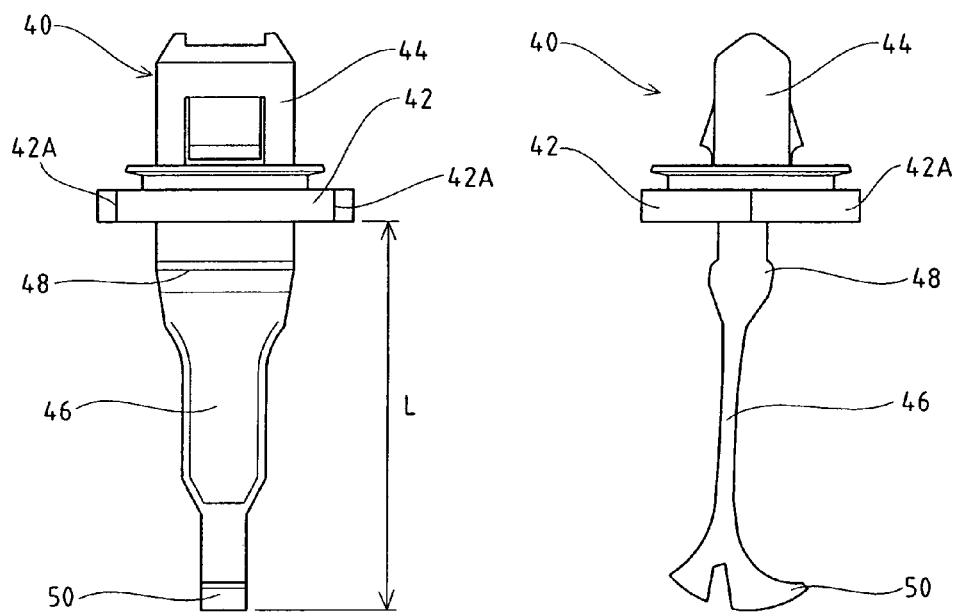
Figure 5:
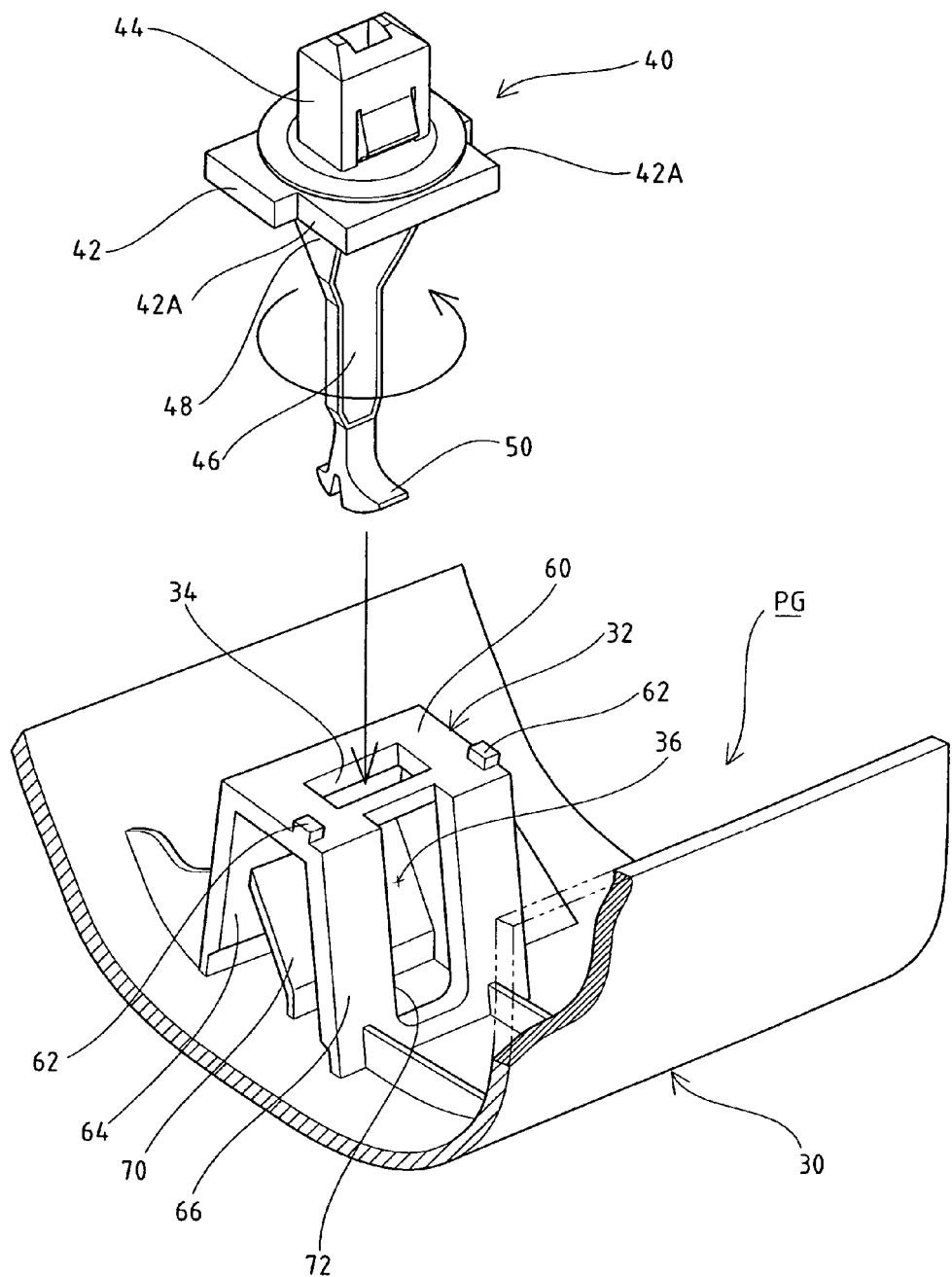
Figure 8:
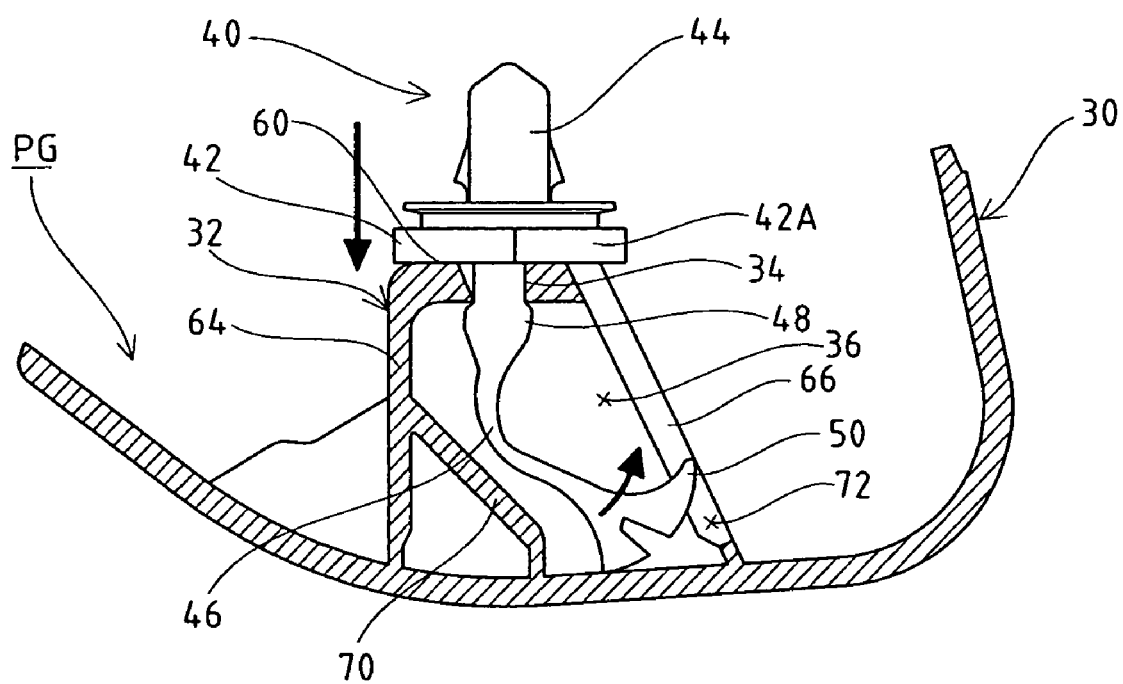
Figure 9:
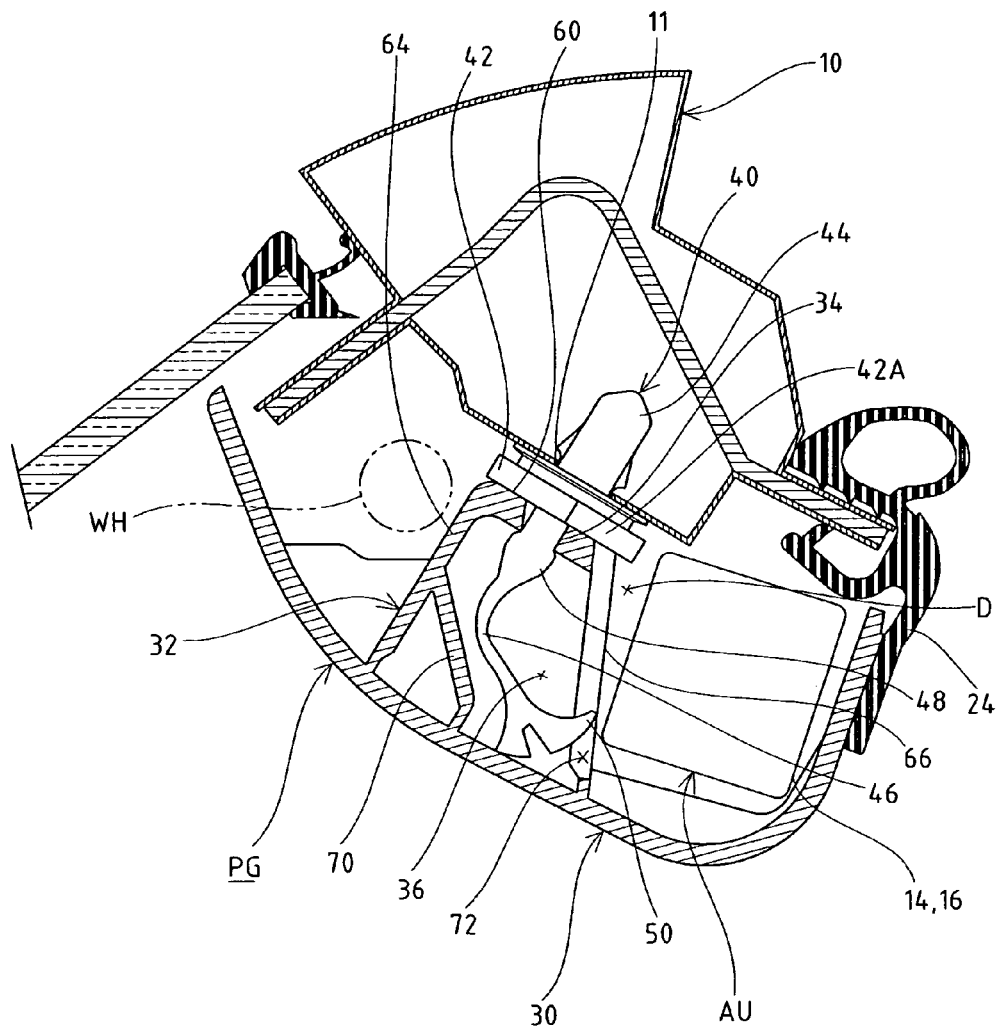
Figure 10:
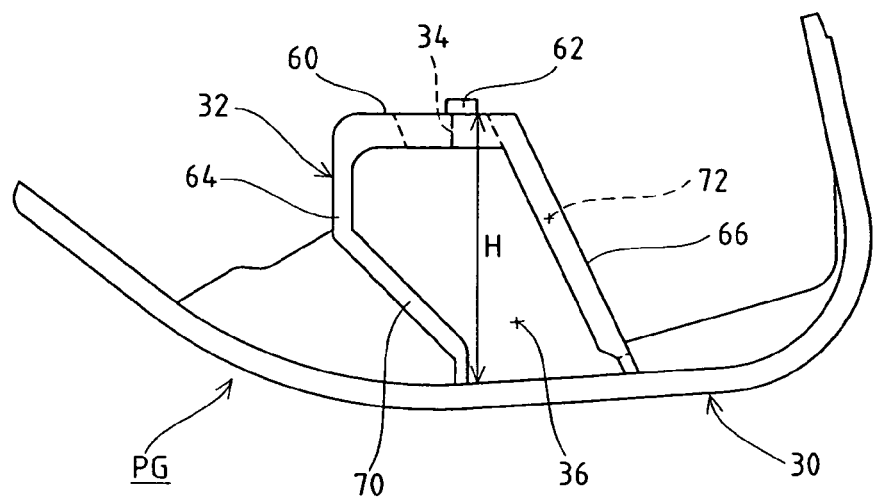
Figure 11:
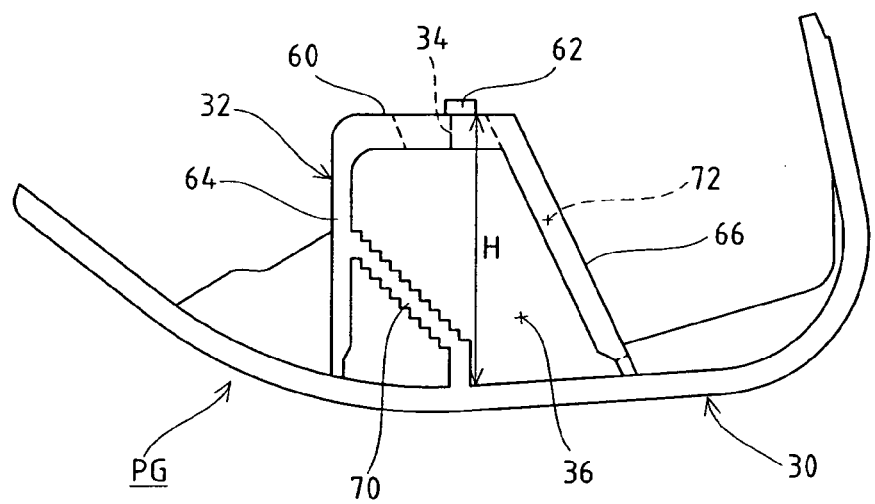
Figure 12:
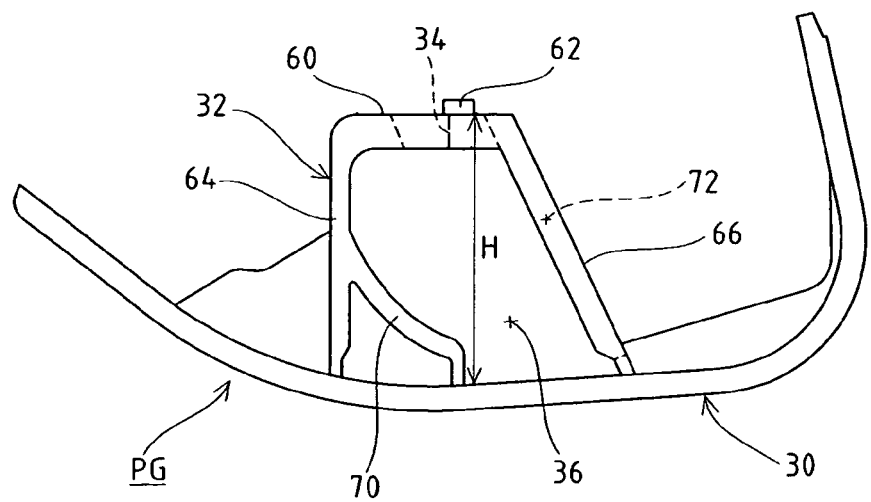
Figure 13:
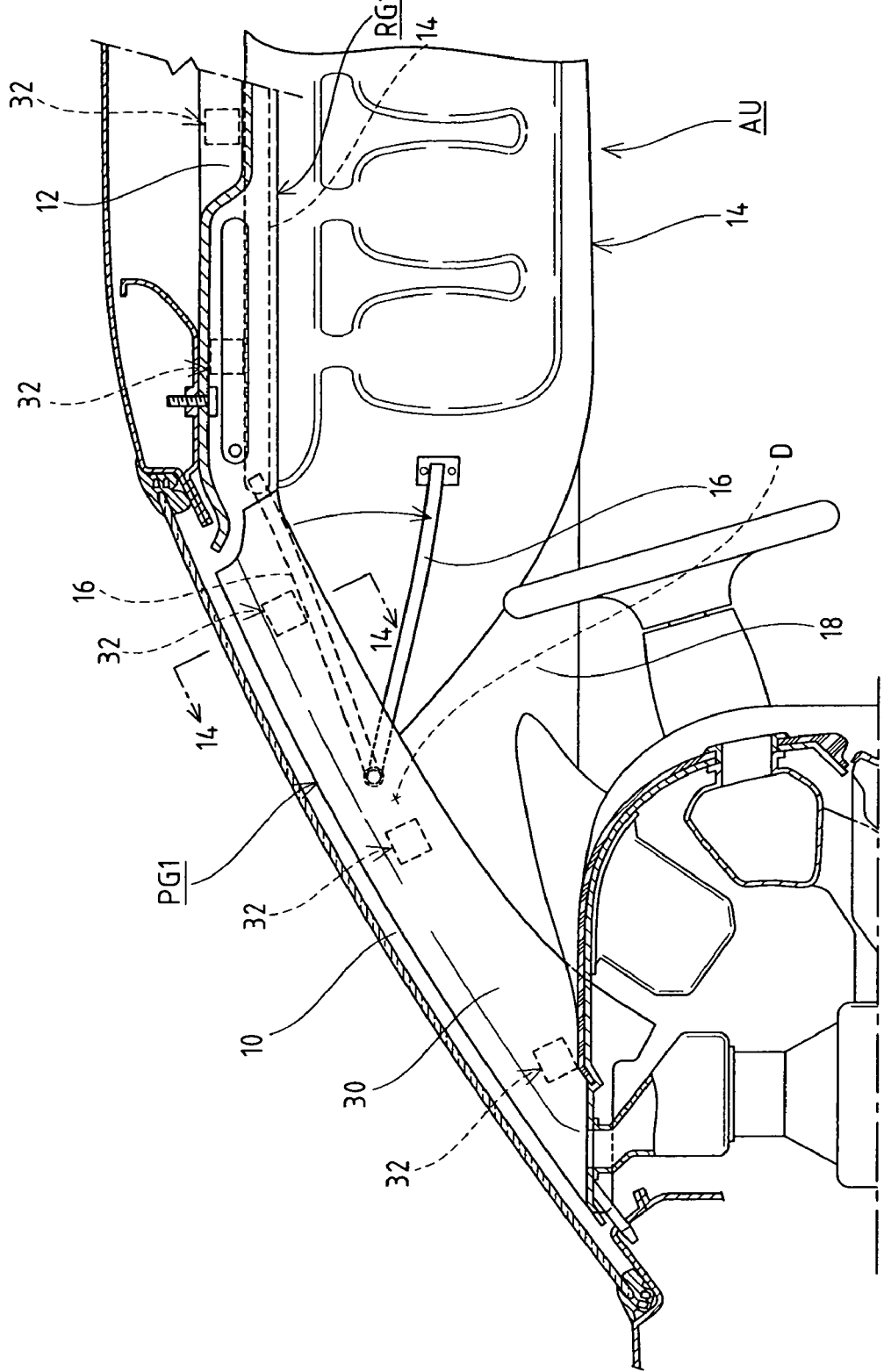
Figure 14:
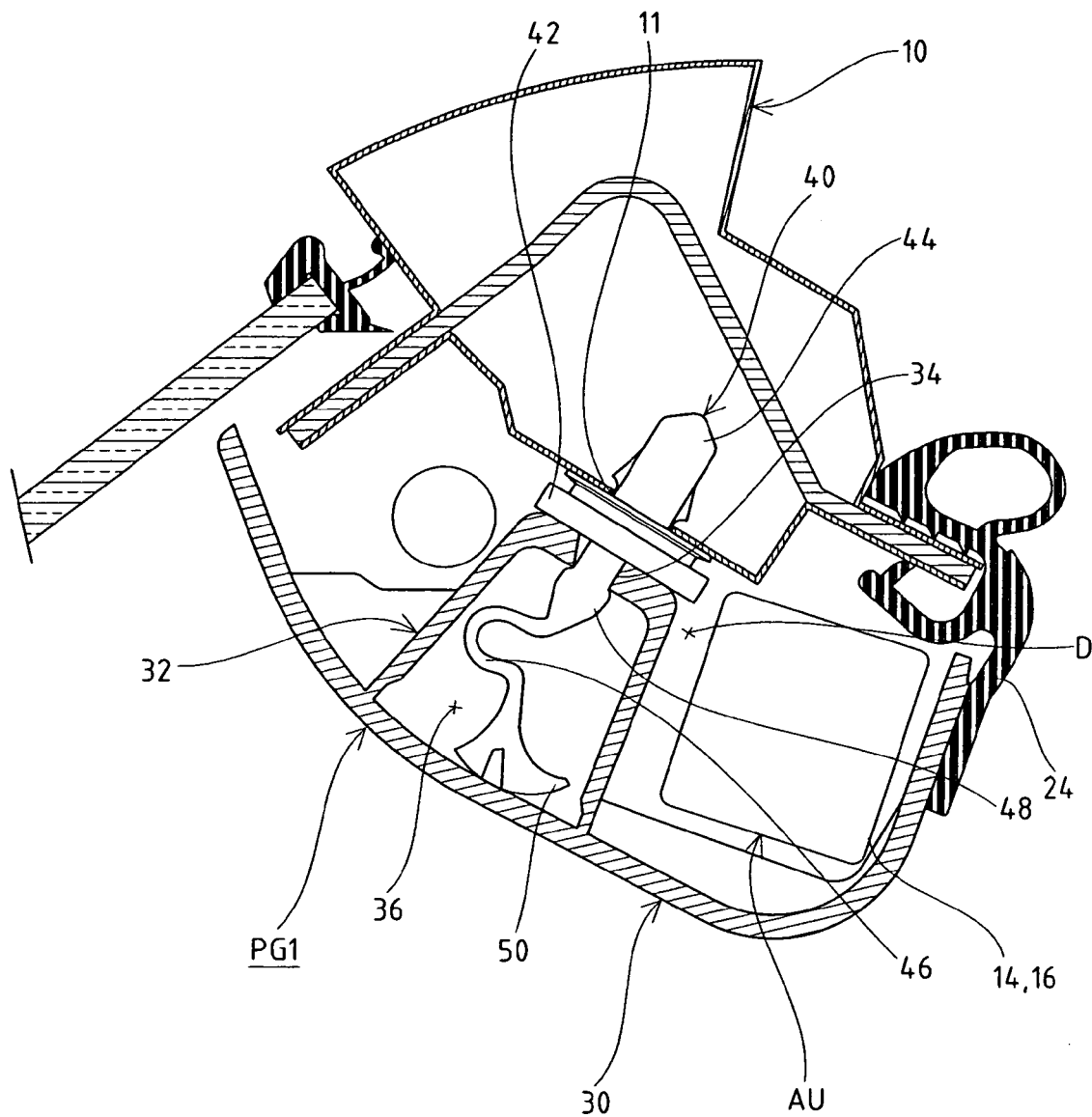
Figure 15:
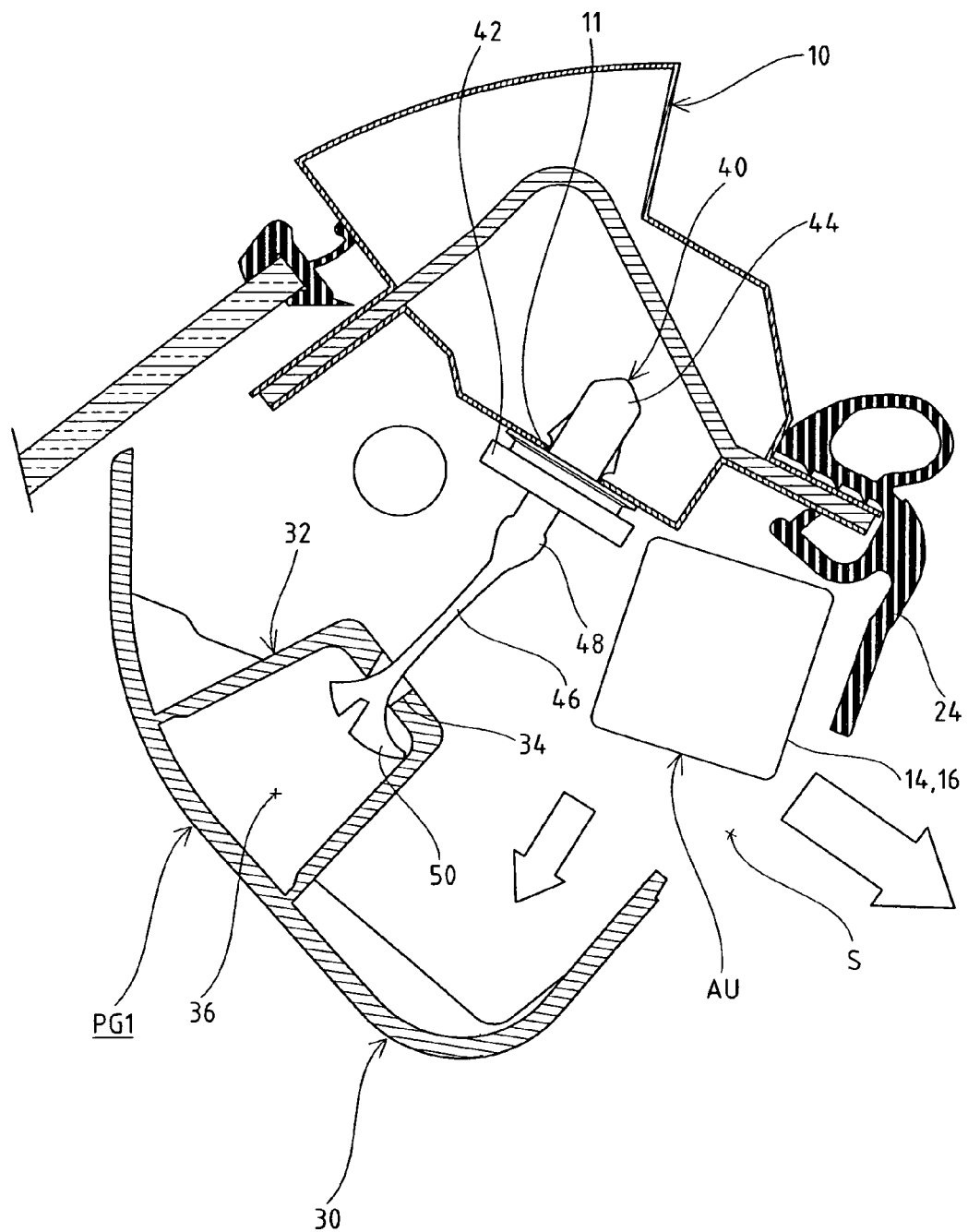

FIGS. 4(a) and 4(b) are a front elevational view and a side elevational view of a mounting clip, respectively;

FIG. 5 is an exploded perspective view of the mounting clip and the mounting bracket which protrudes from the front pillar garnish;

FIGS. 6(a) and 6(b) are respective explanatory views showing the process for inserting the second engaging portion of the mounting clip into the engaging hole of the mounting bracket;

FIGS. 7(a) and 7(b) are respective explanatory views showing the process for inserting the flexible portion of the mounting clip into the engaging hole of the mounting bracket;

FIG. 8 is an explanatory view showing a state in which the first engaging portion of the mounting clip is engaged with the engaging hole of the mounting bracket;

FIG. 9 is a cross sectional view showing the state in which the front pillar garnish is mounted to a front pillar;

FIG. 10 is an explanatory view showing the first form of a touch guiding portion provided in the mounting bracket;

FIG. 11 is an explanatory view showing the second form of the touch guiding portion provided in the mounting bracket;

FIG. 12 is an explanatory view showing the third form of the touch guiding portion provided in the mounting bracket;

FIG. 13 is an explanatory cross sectional view showing a state in which a curtain air bag is expanded and developed;

FIG. 14 is a cross sectional view taken along the line 14-14 of FIG. 13;

FIG. 15 is an explanatory view showing the state in which the front pillar garnish moves away from the front pillar; and FIGS. 16(a) and 16(b) are respective explanatory view showing a prior art process for fastening a mounting clip to a front pillar garnish.

DETAILED DESCRIPTION OF THE INVENTION

Next, the vehicular interior parts according to the present invention will hereinafter be described with reference to the accompanying drawings.

Similar to the conventional interior parts (pillar garnishes) shown in FIG. 14 to FIGS. 16(a) and 16(b), the interior part of the present invention is mounted to a vehicle body portion, having air bag components disposed therein, by a mounting, device after the flexible portion having a predetermined length and extending from the mounting device is inserted into a mounting bracket which is mounted on the inner side of the interior part so as to protrude with a predetermined height from the inner side thereof.

Furthermore, in the present invention as well as shown in FIG. 16(a), the protrusion height H of the mounting bracket 32 provided in the interior part (pillar garnish) is set smaller than the total length L of the flexible portion 46 of the mounting device, and when the mounting device is installed by inserting the flexible portion 46 thereof into the mounting bracket 32, the flexible portion 46 bends. Accordingly, in the embodiment which will be described below, a front pillar garnish is taken as the interior part, and the same parts and portions as those previously described with reference to FIG. 14 to FIGS. 16(a) and 16(b) are designated with the same reference numerals, respectively.

The pillar garnish PG of the shown embodiment has substantially the same construction as that of the conventional front pillar garnish PG1 shown in FIG. 14 to FIGS. 16(a) and 16(b). That is to say, as seen from FIG. 1, the pillar garnish PG includes the garnish main body 30, which is exposed into the interior (passenger compartment) of a vehicle in a predetermined shape that covers the front pillar 10, and the mounting bracket 32, which is integrally formed in a predetermined position on the inner surface of the garnish main body 30, and in which the mounting clip (or a mounting device) 40 with which the garnish main body 30 is mounted to the front pillar 10 is installed. The pillar garnish PG is formed by injection molding using a synthetic resin such as polypropylane (PP). Thus, the garnish main body 30 and the mounting bracket 32 are connected integrally with each other. One or plural mounting brackets are formed on the inner side of the garnish main body 30.

The mounting bracket(s) 32 is formed on the inner surface of the garnish main body 30 so as to protrude with a protrusion height H (see FIG. 16(a)) therefrom in order to ensure the space D (see FIG. 14) in which the above-mentioned air bag supporting member 16, a wire harness WH and the like can be provided between the front pillar 10 and the garnish main body 30, and the accommodating space 36 is defined inside the mounting bracket 32.

Figure 3:
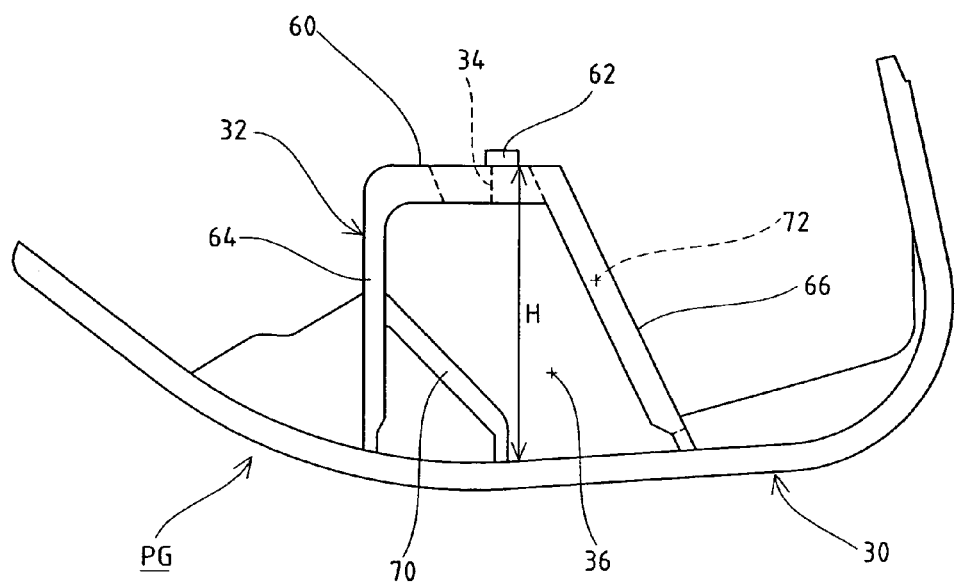
FIG. 3 is a side elevational view of a mounting bracket which is formed on the inner side of a garnish main body so as to protrude from the inner side of the garnish main body.

As shown in FIGS. 3 and 5, the mounting bracket 32 has a reversed channel shape of letter "C" formed integrally with the garnish main body 30. A rectangular engaging hole 34 through which the first engaging portion 48 and the second engaging portion 50 of the mounting clip 40 pass is formed in a top surface portion 60 of the mounting bracket 32. Also, projections 62 are provided on the top surface portion 60 so that they are used to confirm whether the direction of installation of the mounting clip 40 in the mounting bracket 32 is right or not. If the direction of installation of the mounting clip 40 is right, cutout portions 42A (see FIG. 5) of the flange portion 42 of the mounting clip 40 are aligned with the projections 62, and the first engaging portion 48 of the mounting clip 40 comes into engagement with the engaging hole 34.

The mounting clip 40 has basically the same construction as that of the prior art shown in FIG. 16(a). As shown in FIGS. 4(a) and 4(b), the mounting clip 40 of the present invention is comprised of:

(a) the flexible portion 46 having the total length L which is longer than the protrusion height H (see FIG. 3) of the mounting bracket 32;

(b) the first engaging portion 48 which is provided on the proximal end side of the flexible portion 46 and is to be engaged with the engaging hole 34 of the mounting bracket 32 before the air bag apparatus AU (refer to FIG. 13) operates; and (c) the second engaging portion 50 which is provided on the distal end side of the flexible portion 46 and is to be engaged with the engaging hole 34 when the air bag apparatus AU operates.

When the mounting clip 40 is fastened to the mounting bracket 32, as shown in FIG. 5, the second engaging portion 50 and the flexible portion 46 of the mounting clip 40 are inserted in the accommodating space 36 of the mounting bracket 32 through the engaging hole 34, and when the flexible portion 46 bends (see FIG. 8), the first engaging portion 48 of the mounting clip 40 is engaged with the mounting bracket 32.

More specifically, in the mounting clip 40, the engagement fixing portion 44 which is inserted and engaged with the engagement hole 11 of the above-mentioned front pillar 10 (see FIG. 15) is formed on one side (upper side in FIG. 4(a)) of the flange portion 42; and on the other side of the flange portion 42, the first engaging portion 48, the flexible portion 46 and the second engaging portion 50 are formed. Since the flexible portion 46 is formed in a plate-like shape, it can bend in right and left directions in FIG. 4(b). Each of the first engaging portion 48 and the second engaging portion 50 has a rectangular shape substantially matching the engaging hole 34 that has a rectangular shape. Also, the first engaging portion 48 and the second engaging portion 50 are formed so as to be displaced by 90 degrees.

With the structure described above, as seen from FIG. 5 and FIG. 6(b), after the second engaging portion 50 of the mounting clip 40 is inserted into the engaging hole 34 of the mounting bracket 32, the mounting clip 40 is rotated by 90 degrees, whereby the flexible portion 46 can be inserted into the engaging hole 34 and further the first engaging portion 48 can be engaged with the engaging hole 34. In addition, even when the mounting clip 40 is pulled out without being rotated and the engagement of the first engaging portion 48 with the engaging hole 34 is released, the pillar garnish PG is prevented from being separated more than predetermined length from the front pillar 10 since the second engaging portion 50 is caught by the edge of the engaging hole 34.

In the pillar garnish PG of this embodiment, the following construction is adopted, and it solves the problems with the installation of the mounting clip 40 in the prior art.

Firstly, as shown in FIGS. 3 and 5, a guiding portion 70 which extends to cross the insertion direction of the flexible portion 46 is provided between the inner surface of the garnish main body 30 and the engaging hole 34, so that the inserted flexible portion 46 of the mounting clip 40 comes into contact with the guiding portion 70 and as a result is biased. More specifically, as shown in FIG. 6(b), the mounting clip 40 inserted into the engaging hole 34 of the mounting bracket 32 is horizontally rotated by 90 degrees to direct itself toward a direction along which the first engaging portion 48 is engageable with the engaging hole 34. In this state, the guiding portion 70, which extends obliquely from a first sidewall 64 and is located between the inner surface of the garnish main body 30 and the engaging hole 34, waits for the mounting clip 40 coming into contact as explained hereinafter. In other words, the guiding portion 70 takes a shape inclined with respect to the insertion direction of the flexible portion 46. More specifically, the guiding portion 70 is formed so as to extend in a plane of an inclined shape from the central portion, height-wise, of the first sidewall 64 toward the inner surface of the garnish main body 30, and is deviated toward the second sidewall 66 facing the first sidewall 64 as the guiding portion 70 approaches the inner surface of the garnish main body 30.

Consequently, as shown in FIG. 7(a), the second engaging portion 50 of the mounting clip 40 which is inserted into the accommodating space 36 of the mounting bracket 32 through the engaging hole 34 touches the guiding portion 70 before the first engaging portion 48 engages the engaging hole 34, and is pressed by guiding portion 70 toward the second sidewall 66 as the mounting clip 40 is further inserted. As a result, as shown in FIG. 7(b), the flexible portion 46 of the mounting clip 40 bends, so that the moving direction of the second engaging portion 50 inserted into the mounting bracket 32 is biased or changed toward the second sidewall 66. For this reason, unlike the conventional installation construction shown in FIGS. 16(a) and 16(b), the second engaging portion 50 of the mounting clip 40 does not strongly touch the inner surface of the garnish main body 30 located in front of the insertion direction (right under the first engaging portion 48), but as shown in FIG. 8, comes into light contact with the inner surface of the garnish main body 30 in the position where it is biased toward the second sidewall 66.

In addition, in the mounting bracket 32, as seen from FIG. 3, the second sidewall 66 which is located to face the guiding portion 70 is inclined outwardly. In addition, an opening 72 for avoiding contact with the second engaging portion 50 of the mounting clip 40 with the second sidewall 66 is provided in the second sidewall 66, so that the opening 72 functions as an interference (contact) avoiding means. As a result, when the second engaging portion 50 of the mounting clip 40 is biased toward the second sidewall 66 after touching the guiding portion 70, it is avoided that the second engaging portion 50 comes into contact with the second sidewall 66, and thus the biasing or bend of the second engaging portion 50 is not restricted.

Figure 1:
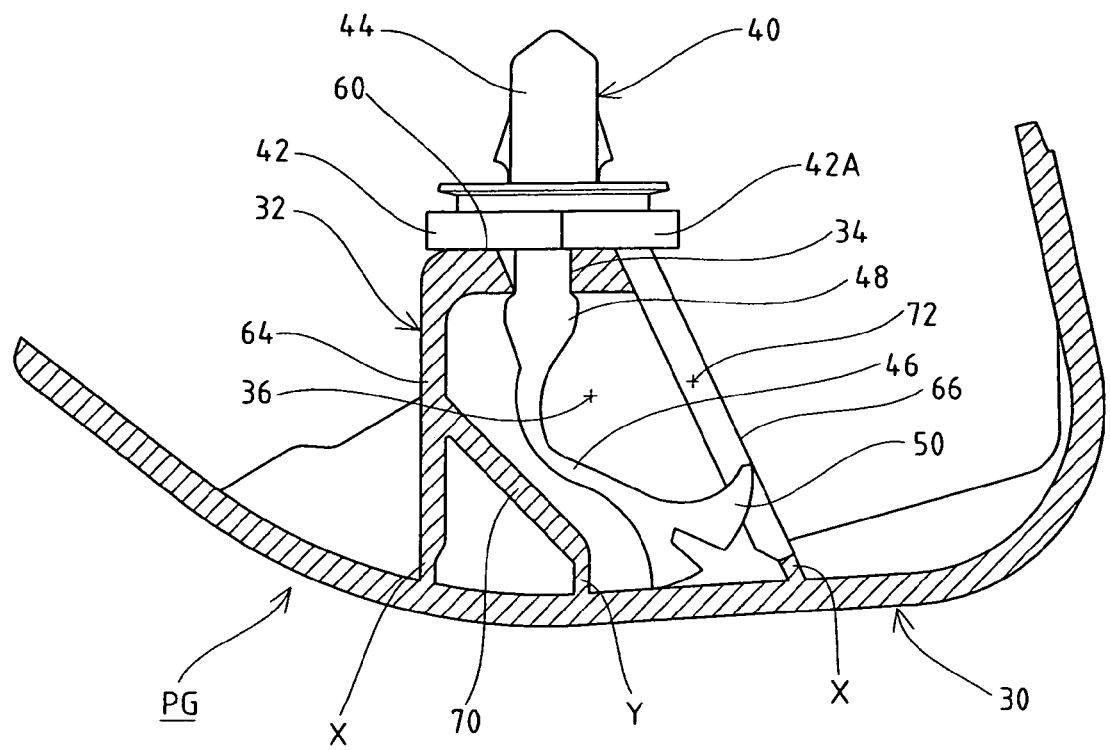
FIG. 1 is a cross sectional view of a front pillar garnish according to one embodiment of the present invention, this cross sectional view being taken along the line I-I of FIG. 2.
Figure 2:
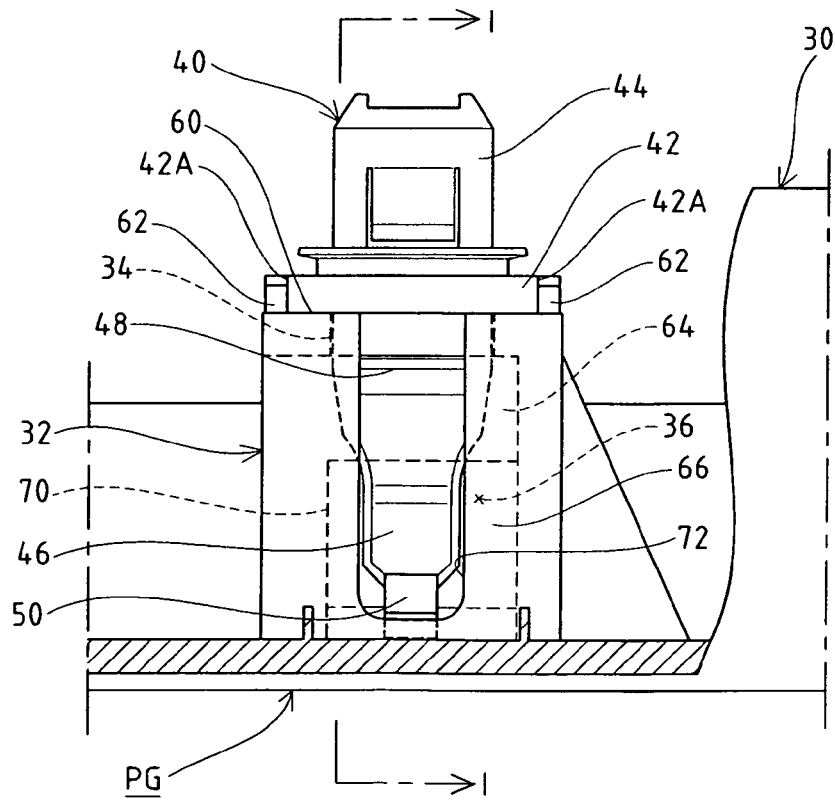
FIG. 2 is a partially cutaway front view of the front pillar garnish shown in FIG. 1.

As seen from FIG. 1, the boundary portions X between the garnish main body 30 and the mounting bracket 32 are thinned in order to take measures to cope with the sink mark that occurs during the injection molding. However, since the guiding portion 70 is formed integrally with the garnish main body 30 and the first sidewall 64 so that the inner surface of the first sidewall 64 and the inner surface of the garnish main body 30 are continuous, the guiding portion 70 functions as a reinforcing member. Accordingly, the connecting portion Y between the guiding portion 70 and the garnish main body 30 is also thinned for the measures to cope with the sink mark.

Next, a process for installing the mounting clip 40 in the mounting bracket 32 of the pillar garnish PG, according to the shown embodiment having the construction described above, will be described with reference to FIG. 6(a) to FIG. 8.

Firstly, as shown in FIG. 6(a), the second engaging portion 50 of the mounting clip 40 is as shown by arrow inserted into the engaging hole 34 of the mounting bracket 32 with the direction of the engaging hole 34 and the direction of the second engaging portion 50 aligned with each other.

As shown in FIG. 6(b), after passing the second engaging portion 50 through the engaging hole 34, the mounting clip 40 is rotated as shown by arrow by 90 degrees so that the direction of the engaging hole 34 of the mounting bracket 32 and the direction of the flexible portion 46 of the mounting clip 40 are aligned with each other.

With this operation, as shown in FIG. 7(a), since the flexible portion 46 of the mounting clip 40 is allowed to be inserted into the engaging hole 34, the mounting clip 40 is further pushed into the mounting bracket 32. During this process, before the first engaging portion 48 of the mounting clip 40 comes into engagement with the engaging hole 34, the second engaging portion 50 of the mounting clip 40 inside the accommodating space 36 of the mounting bracket 32 touches the guiding portion 70. When the mounting clip 40 is further pushed by straight arrow into the mounting bracket 32, as shown in FIG. 7(b) by straight arrow, since the second engaging portion 50 touching the guiding portion 70 is pushed toward the second sidewall 60 as shown by curved arrow, the flexible portion 46 of the mounting clip 40 thus gradually bends inside the accommodating space 36 and is deformed into an "L-shape" by the pushing force, so that the second engaging portion 50 moves toward the second sidewall 66 as the insertion of the mounting clip 40 progresses. At this point, the second engaging portion 50 only touches the guiding portion 70, and is not in contact with the inner surface of the garnish main body 30. Accordingly, the pressing force which is applied to the mounting clip 40 during the insertion of the mounting clip 40 into the accommodating space 36 is hardly applied to the garnish main body 30.

When the first engaging portion 48 of the mounting clip 40 is aligned in direction with the engaging hole 34, by strongly pushing the mounting clip 40 into the mounting bracket 32 as shown by straight arrow in FIG. 8, the first engaging portion 48 is engaged with the engaging hole 34 of the mounting bracket 32 to provide an engagement, so that the flange portion 42 of the mounting clip 40 is brought into tight contact with the top surface portion 60 of the mounting bracket 32. As a result, the second engaging portion 50 of the mounting clip 40 further moves toward the second sidewall 66 as shown by curved arrow, a part thereof reaches the opening 72 of the mounting bracket 32, and the second engaging portion 50 merely comes into light contact with the inner surface of the garnish main body 30.

The pillar garnish PG having the mounting clip 40 thus installed therein as described above is installed as shown in FIG. 9 in the front pillar 10 with the space D formed when the engagement fixing portion 44 of the mounting clip 40 is forcibly inserted into the engagement hole 11 of the front pillar 10.

As seen from the above, the pillar garnish PG of the above-described embodiment has the functions and advantages as described below.

Firstly, the guiding portion 70 is provided inside the accommodating space 36 of the mounting bracket 32; and when the mounting clip 40 is installed in the mounting bracket 32 of the pillar garnish PG, the second engaging portion 50 of the mounting clip 40 can be prevented from being strongly pressed against the inner surface of the garnish main body 30. Consequently, since the pressing force by the second engaging portion 50 is small, the outer surface of the garnish main body 30 is prevented from changing its color to white (whitening), and the texture of the pillar garnish PG is prevented from being deteriorated. Thus, the appearance of the pillar garnish PG is not spoiled.

In addition, the guiding portion 70 in the mounting bracket 32 is formed so as to be inclined with respect to the installation direction of the mounting clip 40 and to the inner surface of the garnish main body 30. Accordingly, the second engaging portion 50 of the mounting clip 40 can move to the side while touching the guiding portion 70, and thus the bending of the flexible portion 46 of the mounting clip 40 inside the accommodating space 36 of the mounting bracket 32 smoothly progresses. In other words, in the conventional front pillar garnish PG1, as shown in FIG. 16(*b*), the flexible portion 46 is not deformed unless the considerably strong force is applied to the flexible portion 46; however, in the pillar garnish PG of the shown embodiment the flexible portion 46 is, as seen from FIG. 7(*b*), smoothly deformed into an "L-shape" by applying only a moderate force thereto. For this reason, in the case of the pillar garnish PG of the shown embodiment, the second engaging portion 50 of the mounting clip 40 is prevented from being strongly pressed against the inner surface of the garnish main body 30, and the problem that the outer surface of the garnish main body 30 changes its color to white is prevented. Thus, the deterioration in texture of the pillar garnish PG is avoided.

Furthermore, the second sidewall 66 of the mounting bracket 32 is provided with the opening 72 so as to be located in the direction along which the second engaging portion 50 of the mounting clip 40 touching the guiding portion 70 moves; accordingly, the movement of the second engaging portion 50 is not restricted, and the second engaging portion 50 is prevented from being strongly pressed against the inner surface of the garnish main body 30 after completion of the installation of the mounting clip 40. Consequently, since even after the installation of the mounting clip 40, the excessive pressing force is prevented from being continuously applied to the inner surface of the garnish main body 30 through the second engaging portion 50; and as a result, even when the heat history is applied, the touch portion of the garnish main body 30 where the mounting clip 40 is in touch with the garnish main body 30 is prevented from being swelled and deformed to the outer surface side.

In addition, since the flexible portion 46 of the mounting clip 40 is smoothly deformed and its deformation amount is also small, small force is only required for installing the mounting clip 40 in the mounting bracket 32 (for engaging the first engaging portion 48 of the mounting clip 40 with the engaging hole 34 of the mounting bracket 32). As a result, the burden on the worker is lightened, and thus the workability for the installation is not disturbed.

Moreover, the flexible portion 46 of the mounting clip 40 in a state in which the mounting clip 40 is installed in the mounting bracket 32 is merely deformed in the "L-shape". Accordingly, when the curtain air bag apparatus AU operates to move the pillar garnish PG (FIG. 15), the flexible portion 46 smoothly passes through the engaging hole 34 of the mounting bracket 32.

It should be noted that the guiding portion 70 provided in the mounting bracket 32 is not limited to the configuration described above, and forms shown in FIGS. 10 to 12, respectively, may also be adopted for the guiding portion 70.

In the structure shown in FIG. 10, the first sidewall 64 of the mounting bracket 32 is inclined, and the inclined portion makes the guiding portion 70. In other words, in the structure of FIG. 10, a part of the first sidewall 64 is constructed as the guiding portion 70. The guiding portion 70 thus formed has the same functions and effects as those of the above-described embodiment. As a result, the mounting clip 40 can be easily installed in the mounting bracket 32, and also it is possible to prevent the deterioration in texture of the pillar garnish PG caused by the installation of the mounting clip 40.

FIG. 11 shows a second variation of the guiding portion 70. Though, in the second variation, the basic form of the guiding portion 70 is the same as that of the above-described embodiment, the touch surface of the guiding portion 70 is different and is formed in a fine stepped shape. The fine stepped shape guiding portion 70 of FIG. 11 has substantially the same functions and effects as those of the above-described embodiment.

Moreover, FIG. 12 shows a third variation of the guiding portion 70 in which the guiding portion 70 is curved shape. The curved guiding portion 70 has substantially the same functions and effects as those of the above-described embodiment, and in addition, an effect of making the bending of the flexible portion 46 of the mounting clip 40 more easily can be expected.

In addition, though in the above-described embodiment, the opening 72 is provided in the second sidewall 66 of the mounting bracket 32 so as to function as an interference avoiding means, the interference avoiding means is not limited to an opening. For example, a portion to which the second engaging portion 50 of the mounting clip 40 would come into contact with the second sidewall 66 can be bulged outward to avoid contact with the second engaging portion 50.

In the shown embodiment, a pillar garnish which is mounted to the front pillar 10 of a vehicle body by utilizing the mounting clip 40 is described as the interior part of the present invention. However, the interior part which is the subject of the present invention is not limited to the front pillar garnish. A roof side garnish which is installed in the roof side frame 12 (see FIG. 13) by utilizing the mounting clip 40, a rear pillar garnish which is mounted to the rear pillar, although not shown, or the like is indeed involved in the present invention.

The interior part parts according to the present invention are mounted to vehicle body portions having air bag components therein and can be implemented in the various kinds of automobiles having air bag apparatuses.

In addition, the interior parts of the present invention, provides useful effects in which the mounting device can be easily installed, deterioration in texture of the garnish main body 30 or the interior of a vehicle caused by the installation of the mounting device and so forth are prevented.

What is claimed is:

1. An interior part for a vehicle which with an aid of a mounting device is mounted to vehicle body portions, having air bag components therein, after a flexible portion having a predetermined length and an engaging portion at a distal end side thereof and extending from said mounting device is inserted into an engaging hole of a mounting bracket protruding with a predetermined height from an inner side of said interior part, wherein:

said mounting bracket is provided therein with a guiding portion against which said engaging portion of said flexible portion inserted through said engaging hole touches and is biased, said guiding portion being provided between an inner surface of said interior part and said engaging hole and in an accommodating space located inside said mounting bracket, and said guiding portion is inclined with respect to a direction in which said flexible portion is inserted into said mounting bracket.

2. The interior part for a vehicle according to claim 1, wherein an opening for avoiding said engaging portion provided in a distal end of said flexible portion from contacting said mounting bracket is provided in said mounting bracket so as to face an inclined surface of said guiding portion.

3. The interior part for a vehicle according to claim 1, wherein said interior part is a pillar garnish.

4. A pillar garnish for a vehicle which with an aid of a mounting clip is mounted to a vehicle body having air bag components therein after a flexible portion having a predetermined length and an engaging portion at a distal end side thereof and extending from said mounting clip is inserted into an engaging hole of a mounting bracket which is formed on an inner surface of said pillar garnish so as to protrude with a predetermined height from the inner surface of said pillar garnish, wherein:

> said mounting bracket is provided therein with a guiding portion against which said engaging portion of said flexible portion inserted through said engaging hole touches and is biased, said guiding portion being provided between said inner surface of said pillar garnish and said engaging hole and in an accommodating space located inside said mounting bracket so as to extend in an inclined shape, and
>
> an opening for avoiding said engaging portion provided in a distal end of said flexible portion from contacting said mounting bracket is provided in said mounting bracket, said opening being provided so as to face an inclined surface of said guiding portion.

5. A mounting means for mounting an interior part of a vehicle to a vehicle body portion, said mounting means comprising:

> a mounting bracket protruding with a predetermined height from an inner side of said inner part;
>
> an engaging hole provided in a top surface of said mounting bracket;
>
> a guiding portion provided between an inner surface of said interior part and said engaging hole within an accommodating space inside said mounting bracket, said guiding portion having an inclined surface facing said engaging hole; and
>
> a connector means provided at one end with a first engaging portion for engaging with said vehicle body portion and at another end with a second engaging portion for engaging with said interior part of the vehicle; wherein
>
> said second engaging portion comprises a flexible elongated portion which is inserted through engaging hole and contacts said guiding portion and is guided by said inclined surface in a direction crossing an insertion direction of said flexible elongated portion.

* * * * *